(12) United States Patent
Shao et al.

(10) Patent No.: US 11,940,590 B1
(45) Date of Patent: Mar. 26, 2024

(54) FAST FORWARD METHOD AND SYSTEM FOR GAMMA-RAY LOGGING OF HIGHLY-DEVIATED AND HORIZONTAL WELLS PRELIMINARY CLASS

(71) Applicant: CHINA UNIVERSITY OF PETROLEUM(EAST CHINA), Qingdao (CN)

(72) Inventors: Cairui Shao, Qingdao (CN); Miantao Yu, Qingdao (CN); Fuming Zhang, Qingdao (CN)

(73) Assignee: CHINA UNIVERSITY OF PETROLEUM(EAST CHINA), Qingdao (CN)

( * ) Notice: Subject to any disclaimer, the term of this patent is extended or adjusted under 35 U.S.C. 154(b) by 0 days.

(21) Appl. No.: 18/470,946

(22) Filed: Sep. 20, 2023

(30) Foreign Application Priority Data

Sep. 30, 2022 (CN) .......................... 202211214456.9

(51) Int. Cl.
*G01V 5/06* (2006.01)
*E21B 49/00* (2006.01)

(52) U.S. Cl.
CPC ............... *G01V 5/06* (2013.01); *E21B 49/00* (2013.01)

(58) Field of Classification Search
CPC .................... G01V 5/06; E21B 49/00
See application file for complete search history.

(56) References Cited

U.S. PATENT DOCUMENTS 4,529,877 A * 7/1985 Arnold ..................... G01V 5/06
250/266

FOREIGN PATENT DOCUMENTS

| CN | 109657346 | * | 4/2019 | ............ G06F 30/20 |
| CN | 114722610 A | * | 4/2022 | ............ G06F 30/20 |

OTHER PUBLICATIONS

First Search Report issued in Chinese Application No. 202211214456. 9; dated Feb. 17, 2023; 5 pgs.
First Office Action issued in Chinese Application No. 202211214456. 9; dated Feb. 19, 2023; 7 pgs.
Notification to Grant issued in Chinese Application No. 202211214456. 9; dated Mar. 9, 2023; 3 pgs.

* cited by examiner

*Primary Examiner* — David P Porta
*Assistant Examiner* — Gisselle M Gutierrez
(74) *Attorney, Agent, or Firm* — HAUPTMAN HAM, LLP

(57) ABSTRACT

Through analysis on an effective detection space of a gamma detector, a one-dimensional equivalent longitudinal contribution coefficient (varying with a distance between a formation and the detector) of a natural gamma-ray flux received by the gamma detector under the condition that the formation and a wellbore are orthogonal is obtained in the effective detection space, and then a corresponding function expression is given by fitting. An integral of a gamma-ray flux received by the detector under the condition of a deviated well is converted into a one-dimensional equivalent integral problem under the condition of a straight well, so as to achieve the fast forward of natural gamma-ray logging of the formation under the conditions of highly-deviated and horizontal wells. This simplified fast forward algorithm can replace a gamma forward method of spherical spatial-division integrals in parallel sedimentary formations, reduce a space-time complexity of algorithms, and improve a calculation efficiency.

10 Claims, 5 Drawing Sheets

Based on an effective detection space of a gamma detector, in the effective detection space, obtain a one-dimensional equivalent longitudinal contribution coefficient (varying with a distance between a formation and the center of the detector) of a gamma-ray flux received by the gamma detector under the condition of a straight well

↓

Convert an integral of a gamma-ray flux received by the detector under the condition of a deviated well into an equivalent integral of the gamma-ray flux in a same contribution space under the condition of the straight well

↓

Perform fast forward for gamma-ray logging of highly-deviated and horizontal wells under the condition of parallel sedimentary formations by using the obtained equivalent integral under the condition of the straight well, and then obtain a forward value of a measurement point according to the one-dimensional equivalent longitudinal contribution coefficient

FIG. 8

FAST FORWARD METHOD AND SYSTEM FOR GAMMA-RAY LOGGING OF HIGHLY-DEVIATED AND HORIZONTAL WELLS PRELIMINARY CLASS

RELATED APPLICATIONS

The present application claims priority from Chinese Application Number 202211214456.9, filed Sep. 30, 2022, the disclosure of which is hereby incorporated by reference herein in its entirety.

TECHNICAL FIELD

The present invention relates to the technical field of geophysical natural gamma-ray logging, and particularly relates to a fast forward method and system for gamma-ray logging of highly-deviated and horizontal wells.

BACKGROUND

In drilling processes, various petrophysical parameters and wellbore trajectory parameters of formations through which wellbores are drilled will be measured in real time in logging-while-drilling. With this information, fast real-time formation evaluation and geosteering can be realized, and the rates of oil and gas recovery can be enhanced. Therefore, the LWD (logging-while-drilling) geosteering technology has become a research hotspot in the field of oil and gas exploration and development.

The key to geosteering is to correctly determine formation interfaces and occurrences. Since the gamma-ray logging-while-drilling can better reflect reservoir boundaries, the forward and inversion technologies can be used to assist in determining the formation interfaces and occurrences. In addition, gamma-ray logging is also affected by the convolution smoothing of adjacent layers (especially when an included angle between a wellbore trajectory and a formation is small), resulting in smooth responses at the interfaces. Therefore, it is also necessary to improve the resolution of formation interfaces in gamma-ray logging-while-drilling.

Due to a large amount of calculation and a slow speed of the Monte Carlo method, it is difficult to meet the requirements of fast real-time forward of gamma-ray logging. Therefore, in Chinese patent ZL201310221099.3, a fast forward algorithm of gamma-ray logging-while-drilling by using spherical spatial-division integrals is proposed, but the algorithm is relatively complicated.

In order to reduce the smoothing effect of a formation, under the condition that a well axis is orthogonal to a formation, some scholars take a natural gamma-ray flux of an infinite plane monochromatic gamma radiation source at a certain point on the well axis as a system response function, and as a convolution factor, such that a deconvolution method is used to reduce the smoothing effect of the formation. However, studies on the form of convolution factors are mostly derived from empirical formulas, so the precision is low in actual data processing, and it is difficult to apply to highly deviated and horizontal wells. Existing methods and technologies mainly have the following deficiencies:

1. The logic of a fast forward calculation algorithm of gamma-ray logging-while-drilling using spherical spatial-division integrals is relatively complicated; and 2. The natural gamma flux of an infinite plane monochromatic gamma radiation source at a point on the well axis is used as the system response function, and as a convolution factor form mostly derived from empirical formulas, therefore, the precision is low in actual data processing, and it is difficult to apply to highly deviated and horizontal wells.

Therefore, it is of great significance to study a more convenient one-dimensional equivalent fast forward method for gamma-ray logging of highly deviated and horizontal wells.

SUMMARY

In order to solve the problems in the prior art, the present invention provides a fast forward method and system for gamma-ray logging of highly-deviated and horizontal wells. Based on an effective detection space of a gamma detector, in the effective detection space, one-dimensional equivalent longitudinal contribution coefficients of a gamma-ray flux received by the gamma detector is obtained from formations at different distances from the detector under the condition of a straight well; an integral of a gamma-ray flux received by the detector under the condition of a deviated well is converted into a one-dimensional equivalent integral under the condition of the straight well; and fast forward is performed on gamma-ray logging of highly-deviated and horizontal wells under the condition of parallel sedimentary formations by using the equivalent integral obtained under the condition of the straight well to obtain a forward value of a measurement point. The deviated well refers to a well whose wellbore is non-orthogonal to the formation, and the straight well refers to a well whose wellbore is perpendicular to the formation. The present invention provides a simplified fast forward algorithm for gamma-ray logging of highly-deviated and horizontal wells, which can replace a gamma forward method of spherical spatial-division integrals in parallel sedimentary formations, reduce a space-time complexity of algorithms, improve a calculation efficiency, and provide an algorithm basis for fast inversion.

The present invention provides a fast forward method for gamma-ray logging of highly-deviated and horizontal wells, which includes the following steps:

step S1: based on an effective detection space of a gamma detector, in the effective detection space, obtaining a one-dimensional equivalent longitudinal contribution coefficient (varying with a distance between a formation and the center of the detector) of a gamma-ray flux received by the gamma detector under the condition of a straight well;

step S2: converting an integral of a gamma-ray flux received by the detector under the condition of a deviated well into an equivalent integral of the gamma-ray flux in a same contribution space under the condition of the straight well; and step S3: performing fast forward for gamma-ray logging of highly-deviated and horizontal wells under the condition of parallel sedimentary formations by using the obtained equivalent integral under the condition of the straight well, and then obtaining a forward value of a measurement point according to the one-dimensional equivalent longitudinal contribution coefficient, where the deviated well refers to a well whose wellbore is non-orthogonal to the formation, and the straight well refers to a well whose wellbore is orthogonal to the formation.

Preferably, the forward value of the measurement point is obtained by weighting the gamma-ray flux of the formation according to the one-dimensional equivalent longitudinal contribution coefficient obtained under the condition of the straight well.

Preferably, step S1 includes the following steps:

S11: enabling a formation gamma-ray received by the detector to be equivalent to a formation gamma-ray intensity in a spherical space from an effective detection radius $r_0$ of the gamma detector to obtain a gamma-ray flux of the formation received by the detector; and S12: in an effective detection radius $r_0$ space of the gamma detector, obtaining a gamma-ray contribution coefficient of a formation at a distance of z from the center of the detector along a well axis under the condition of the straight well.

Preferably, step S11 includes the following processes:

for an infinitely large uniform formation, assuming that a gamma source intensity density of the formation is $I_0$ and an average linear attenuation coefficient of gamma-rays passing through the formation is μ;

by considering the gamma detector as a point crystal, establishing a spherical coordinate system with the center of the detector as the origin, where a distance between the formation and the origin is R; and according to the following formula of a natural gamma-ray flux of a certain point in the infinitely large uniform formation in the spherical coordinate system, obtaining the gamma-ray flux of the formation received by the gamma detector:

$$J_R = \frac{I_0}{\mu}\left(1 - e^{-\mu R}\right)$$

according to the average linear attenuation coefficient μ of gamma-rays passing through the formation, obtaining a radius $r_0$ when the gamma-ray flux reaches 99% of a gamma-ray flux corresponding to the infinitely large formation, and taking $r_0$ as the effective detection radius of the gamma detector; and allowing the distance between the infinitely large formation and the origin to tend to infinity, at this time, a limit value of the gamma-ray flux is $I_0/\mu$;

where, $I_0$ refers to the gamma source intensity density of the formation, unit: number of photons·cm$^{-3}$;

μ refers to the average linear attenuation coefficient of gamma-rays passing through the formation, unit: cm$^{-1}$;

R is the distance between the formation and the origin, unit: cm; and $J_R$ refers to the gamma-ray flux of the formation received by the detector, unit: number of photons·cm$^{-2}$.

Preferably, step S12 includes the following steps:

under the condition of the straight well, in the case that the formation is considered to be in the shape of a parallel slab, a scintillator in the gamma-ray detector is considered to be in the shape of a point and coincides with the center of the detector, and the influence of a wellbore environment and the outer wall of the instrument is ignored, establishing a cylindrical coordinate system with the center of the gamma detector as the origin;

within the effective detection radius $r_0$ of the gamma detector, considering a formation at a vertical distance of z from the center of the gamma detector along the well axis as an infinitely thin slab surface source perpendicular to the well axis;

dividing the surface source into several sector differentials ds with the well axis as the center, where the contribution of the sector differential ds to the gamma-ray flux at the center of the gamma detector is as follows:

$$d\phi_{r_0 z} = \frac{I_0}{4\pi(r^2 + z^2)}e^{-\mu\sqrt{(r^2+z^2)}}ds = \frac{I_0}{4\pi(r^2 + z^2)}e^{-\mu\sqrt{(r^2+z^2)}}rdrd\varphi$$

so in the effective detection space $r_0$, the gamma-ray flux of the thin slab surface source of the formation at a distance of z from the center of the detector along the well axis to the detector is expressed as follows:

$$\phi_{r_0 z} = \frac{I_0}{2}\int_{\mu z}^{\mu r_0}\frac{e^{-t}}{t}dt$$

replacing a gamma-ray flux $\Phi_z$ of the thin slab surface source of the infinitely large formation (at a distance of z from the center of the gamma detector along the well axis) to the gamma detector in the infinitely large space with the above formula:

$$\phi_z = \frac{I_0}{2}\int_0^{\frac{\pi}{2}} e^{-\mu z \sec\theta}\tan\theta d\theta$$

under the condition of a straight well, enabling the contribution coefficient varying with the distance between the formation and the detector in the effective detection space to be equivalent to the contribution coefficient varying with the distance between the formation and the detector in the infinitely large integral space, and taking the contribution coefficient varying with the distance between the formation and the detector in a finitely large integral space as the one-dimensional equivalent longitudinal contribution coefficient (varying with the distance between the formation and the detector) of the gamma-ray flux received by the gamma detector;

where, $I_0$ refers to the gamma source intensity density of the formation, unit: number of photons·cm$^{-3}$;

$d_s$ refers to the sector differential in the surface source of the formation at a vertical distance of z from the center of the gamma detector along the well axis;

μ refers to the average linear attenuation coefficient of gamma-rays passing through the formation, unit: cm$^{-1}$;

r refers to a distance between the sector differential in the formation and the well axis, and a value interval is $$\left[0, \sqrt{r_0^2 - z^2}\right];$$

unit: cm;

θ is an included angle between a line of connecting a certain point on a circle with the well axis as the center and with a radius of r to the center O of the gamma detector and the well axis from the center of the gamma detector to the surface source of the infinitely thin slab formation (at a distance of z from the center of the gamma detector along the well axis);

φ refers to an included angle between a certain point with a radius vector of r and an X axis in the cylindrical coordinate system, and dφ refer to a differential thereof.

Preferably, step S12 includes the following processes:

under the condition of the straight well, in the case that the formation is considered to be in the shape of a parallel slab, a scintillator in the gamma-ray detector is considered to be in the shape of a point and coincides with the center of the detector, and the influence of a wellbore environment and the outer wall of the instrument is ignored, establishing a cylindrical coordinate system with the center of the gamma detector as the origin;

assuming that a gamma source intensity density of the formation is $I_0$ and an effective detection radius of the gamma detector is $r_0$;

within the effective detection radius $r_0$, considering a formation at a vertical distance of z from the center of the gamma detector along the well axis as an infinitely thin slab surface source perpendicular to the well axis, and dividing the surface source into several sector differentials ds—rdφdr with the well axis as the center, where the slab surface source refers to that the formation is considered to be a differential unit composed of several infinitely thin slab radioactive sources along the normal direction of the formation, and ds is a sector differential of the surface source of the formation; and the geometric meaning is shown in FIGS. 1 and 2; r is a distance between the sector differential in the surface source and the well axis, and a value range of r is 0~$\sqrt{r_0^2-z^2}$;

the contribution of the sector differential $d_s$ to the gamma-ray flux at the center of the gamma detector is as follows:

$$d\phi_{r_0z} = \frac{I_0}{4\pi(r^2+z^2)} e^{-\mu\sqrt{(r^2+z^2)}} ds = \frac{I_0}{4\pi(r^2+z^2)} e^{-\mu\sqrt{(r^2+z^2)}} r dr d\varphi$$

so the natural gamma flux of the surface source (at a vertical distance of z from the center of the detector along the well axis) at the center of the gamma detector is:

$$\phi_{r_0z} = \frac{1}{4\pi}\int_0^{2\pi}\int_0^{\sqrt{r_0^2-z^2}} \frac{I_0}{r^2+z^2} e^{-\mu\sqrt{r^2+z^2}} r dr d\varphi = \frac{1}{2}\int_0^{\sqrt{r_0^2-z^2}} \frac{I_0}{r^2+z^2} e^{-\mu\sqrt{r^2+z^2}} r dr$$

setting $t=\mu\sqrt{r^2+z^2}$, so the above formula is converted to:

$$\phi_{r_0z} = \frac{I_0}{2}\int_{\mu z}^{\mu r_0} \frac{e^{-t}}{t} dt$$

the formula is the gamma-ray flux of the surface source of the thin slab formation at a distance of z from the center of the detector along the well axis to the detector in the effective detection space $r_0$; replacing the gamma-ray flux of the thin slab surface source of the infinitely large formation (at a distance of z from the center of the gamma detector along the well axis) to the detector in the infinitely large space with the formula:

$$\phi_z = \frac{I_0}{2}\int_0^{\frac{\pi}{2}} e^{-\mu z\sec\theta} \tan\theta d\theta$$

where θ is an included angle between a line of connecting a certain point on a circle with the well axis as the center and with a radius of r to the center O of the gamma detector and the well axis from the center of the gamma detector to the surface source of the infinitely thin slab formation (at a distance of z from the center of the gamma detector along the well axis);

under the condition of a straight well, enabling the contribution coefficient varying with the distance between the formation and the detector in the effective detection space to be equivalent to the contribution coefficient varying with the distance between the formation and the detector in the infinitely large integral space, and taking the contribution coefficient varying with the distance between the formation and the detector in a finitely large integral space as the one-dimensional equivalent longitudinal contribution coefficient (varying with the distance between the formation and the detector) of the gamma-ray flux received by the gamma detector;

where $I_0$ refers to the gamma source intensity density of the formation, unit: number of photons·cm$^{-3}$;

$d_s$ refers to the sector differential in the surface source of the formation at a vertical distance of z from the center of the gamma detector along the well axis;

z refers to the distance from the surface source of the formation along the well axis to the center of the gamma detector, unit: cm$^{-1}$;

$d\Phi_{r_0z}$ is the gamma-ray flux of the sector differential in the surface source (at a vertical distance of z from the center of the gamma detector along the well axis) to the center of the gamma detector within the detection radius $r_0$;

$\Phi_{r_0z}$ is the natural gamma flux of the surface source (at a vertical distance of z from the center of the detector along the well axis) at the center of the gamma detector within the detection radius $r_0$;

$\Phi_z$ is the natural gamma-ray flux of the surface source (at a vertical distance of z from the center of the detector along the well axis) of the infinitely large formation at the center of the gamma detector;

φ refers to an included angle between a certain point with a radius vector of r and an X axis in the cylindrical coordinate system, and dφ refer to a differential thereof.

Preferably, step S1 further includes step S13 implemented by further obtaining a fitting formula of the one-dimensional equivalent longitudinal contribution coefficient.

Preferably, the further obtaining a fitting formula of the one-dimensional equivalent longitudinal contribution coefficient is specifically implemented by: step S13: performing function fitting on numerical integral calculation results in the effective detection space, and obtaining a bilateral function fitting expression of the one-dimensional equivalent longitudinal contribution coefficient by using a double exponential model.

Preferably, in step S13, the obtaining a bilateral function fitting expression of the one-dimensional equivalent longitudinal contribution coefficient by using a double exponential model is specifically implemented by: fitting the one-dimensional equivalent longitudinal contribution coefficient in the following manner:

normalizing the gamma-ray source intensity density $I_0$ of the formation to obtain a double-exponential function fitting model:

$$g_z = Ae^{bz} + Ce^{dz}$$

where A, C, b and d are fitting coefficients;

transforming the double-exponential function into a symmetric function so as to form a bilateral function;

calculating a natural gamma flux of the surface source (at a distance of z from the center of the detector along the well axis under the condition of the straight well) at the center of the gamma detector by using the double-exponential function fitting model in the effective detection space, and normalizing the natural gamma flux such that the sum of the natural gamma-ray fluxes $g_z$ of the surface sources (at different distances from the center of the detector along the well axis) at the center of the gamma-ray detector is 1, and then the one-dimensional equivalent longitudinal contribution coefficient is obtained.

Preferably, step S2 includes the following steps:

step S21: constructing an equivalent detection sphere whose radius is the effective detection radius $r_0$ of the gamma detector by taking a current detection point as the center of the sphere, and determining an effective gamma-ray flux contribution area of the current detection point; and step S22: when the wellbore is perpendicular to the formation, directly adopting an equivalent integral under the condition of the straight well; and when an included angle between the wellbore and the formation is less than 90°, in an effective gamma-ray flux contribution space, converting the integral of the gamma-ray flux received by the detector under the condition of the deviated well into the equivalent integral under the condition of the straight well;

where the equivalent integral under the condition of the straight well is obtained by using the one-dimensional equivalent longitudinal contribution coefficient to perform weighted accumulation on the gamma-ray fluxes of the formations at different distances from the center of the gamma detector within the effective detection range.

Preferably, step S22 specifically includes the following steps:

calculating a vertical distance between the current detection point and each formation interface, obtaining contribution coefficients of the formations at different distances from the detection point to an integral of the gamma-ray flux of the current point by using the double-exponential function fitting model in step S13, and performing weighted integration on the gamma-ray fluxes of the formations at different distances from the detection point along the normal direction of the formation by using the contribution coefficients to obtain a gamma-ray flux of the detection point.

The present invention further provides a fast forward system for gamma-ray logging of highly-deviated and horizontal wells, which performs fast forward for gamma-ray logging of highly-deviated and horizontal wells by using any one of the above fast forward methods for gamma-ray logging of highly-deviated and horizontal wells, and includes the following modules:

a logging condition determination module, configured to determine intersection situations of a logging record point and a formation boundary, and determine whether a logged well is a straight well or a deviated well;

a gamma-ray equivalent longitudinal coefficient determination module under the condition of the straight well, configured to, based on an effective detection space of a gamma detector, in the effective detection space, obtain one-dimensional longitudinal equivalent contribution coefficients (varying with distances between formations and the detector) of the formations at different distance from the detector to a gamma-ray flux received by detector under the condition of the straight well;

a conversion module for integrals of gamma-ray fluxes, configured to convert an integral of the gamma-ray flux received by the detector under the condition of the deviated well into an equivalent integral of a gamma-ray under the condition of the straight well; and a forward module, configured to calculate a forward value of each measurement point.

Compared with the prior art, the present invention has the beneficial effects as follows:

(1) according to the present invention, a function expression of a one-dimensional equivalent longitudinal contribution coefficient (varying with the distance between the formation and the detector) of the natural gamma-ray flux received by the gamma detector in the effective detection space under the condition that the formation is orthogonal to the wellbore is obtained, and a fast weighted calculation method in the effective detection space under the condition of the straight well is given; by converting the integral of the gamma-ray flux received by the detector under the condition of the deviated well into the one-dimensional equivalent integral problem under the condition of the straight well, the fast forward of natural gamma-ray logging under the conditions of highly-deviated and horizontal wells is achieved, thereby overcoming a difficulty that real-time forward is difficult to be performed in the Monte Carlo method; compared with the spherical spatial-division integral algorithm, the algorithm complexity can be reduced, and the calculation efficiency can be improved; and a new method technology is provided for real-time gamma-ray forward of logging-while-drilling; and (2) according to the present invention, on the basis of obtaining the one-dimensional equivalent longitudinal contribution coefficient of gamma-ray logging, the integral of the gamma-ray flux received by the detector under the condition of the deviated well is converted into the equivalent integral of the gamma-ray under the condition of the straight well, which provides an algorithm basis for improving the vertical resolution and fast inversion of gamma-ray logging of high-deviation and horizontal wells.

BRIEF DESCRIPTIONS OF THE DRAWINGS

Figure 4:
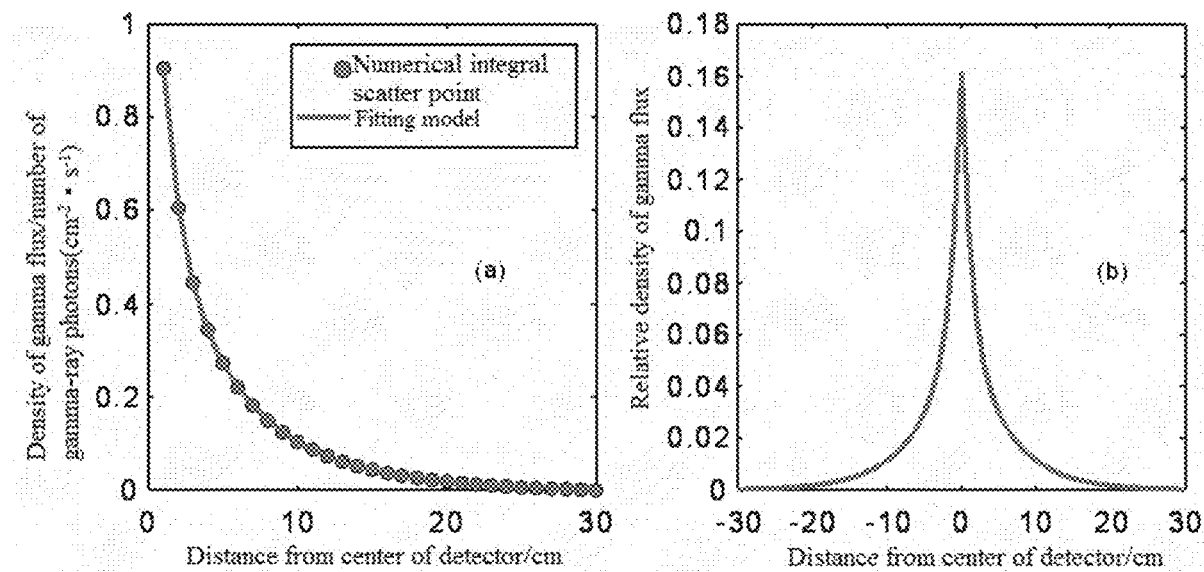
Figure 5:
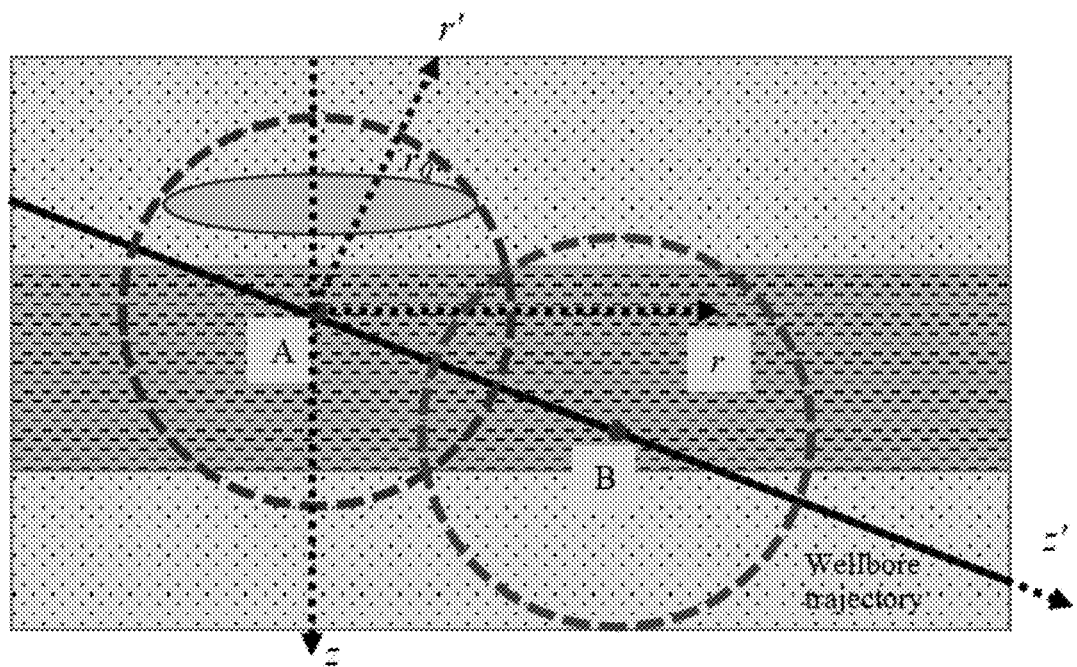
Figure 6:
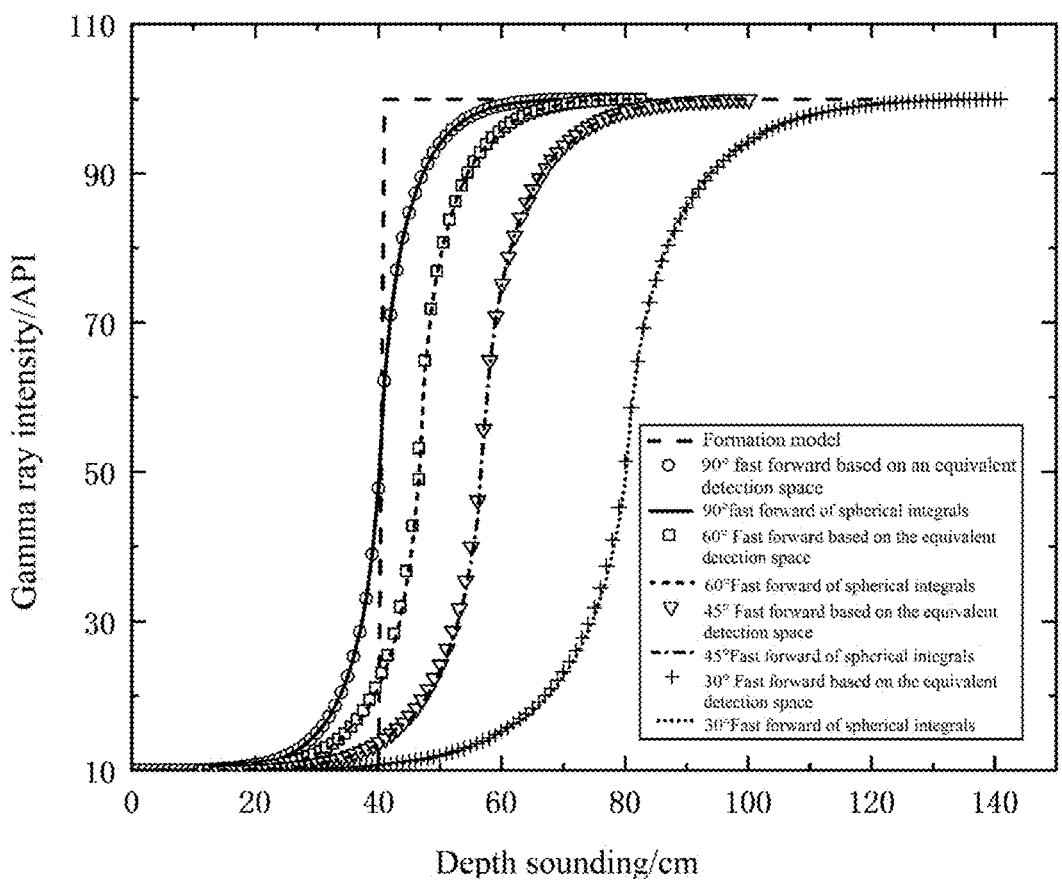
Figure 7:
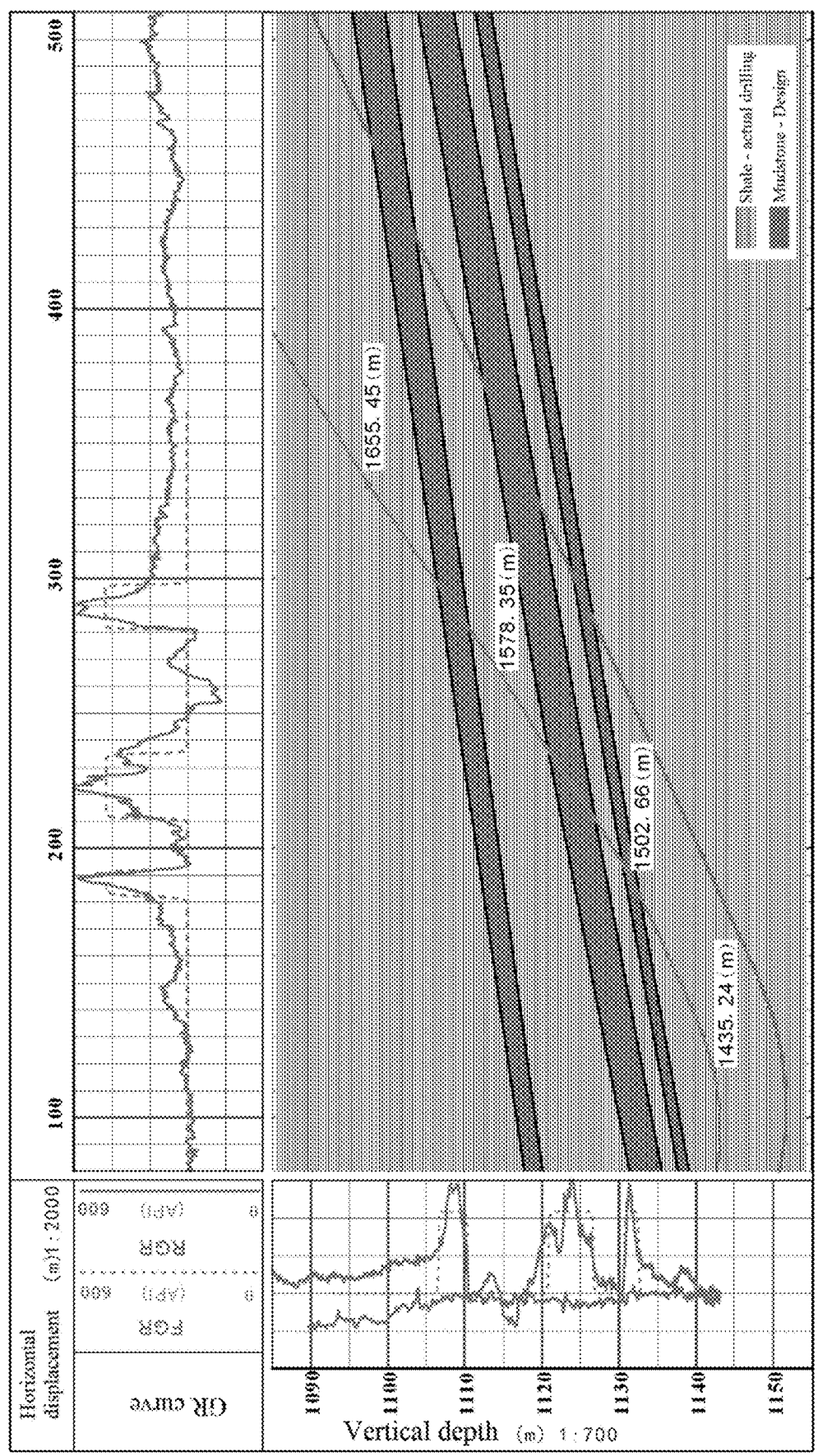

FIG. 4 is a fitting result of the one-dimensional equivalent longitudinal contribution coefficients along the normal direction of the formation based on the effective detection space provided by the present invention, where a in FIG. 4 is a numerical integral and fitting function calculation result, and b FIG. 4 is a one-dimensional equivalent longitudinal contribution coefficient of a bilateral function;

FIG. 5 is a schematic diagram of a fast forward model of one-dimensional gamma-ray logging of highly deviated and horizontal wells based on an equivalent detection space provided by the present invention;

FIG. 6 is a calculation result comparison of fast forward of one-dimensional gamma-ray logging-while-drilling and fast forward of spherical integral gamma-ray logging-while-drilling based on the equivalent detection space provided by the present invention;

FIG. 7 is an example of the fast forward of one-dimensional gamma-ray logging-while-drilling of highly deviated and horizontal wells based on the equivalent detection space provided by the present invention;

FIG. 8 is a flow chart of a fast forward method for gamma-ray logging of highly deviated and horizontal wells according to embodiments of the present invention.

DETAILED DESCRIPTIONS OF EMBODIMENTS

Specific embodiments of the present invention are described in detail below with reference to FIGS. 1-8.

The present invention provides a fast forward method for gamma-ray logging of highly-deviated and horizontal wells, which includes the following steps:

step S1: based on an effective detection space of a gamma detector, a one-dimensional equivalent longitudinal contribution coefficient (varying with a distance between a formation and the center of the detector) of a gamma-ray flux received by the gamma detector under the condition of a straight well is obtained in the effective detection space, where before step S1, related conditions of an intersection of a logging record point and the formation need to be determined first;

step S2: an integral of a gamma-ray flux received by the detector under the condition of a deviated well is converted into an equivalent integral of the gamma-ray flux in a same contribution space under the condition of the straight well; and step S3: fast forward for gamma-ray logging of highly-deviated and horizontal wells under the condition of parallel sedimentary formations is performed by using the obtained equivalent integral under the condition of the straight well, and then a forward value of a measurement point is obtained according to the one-dimensional equivalent longitudinal contribution coefficient, where the deviated well refers to a well whose wellbore is non-orthogonal to the formation, and the straight well refers to a well whose wellbore is orthogonal to the formation.

According to a specific embodiment of the present invention, the forward value of the measurement point is obtained by weighting the gamma-ray flux of the formation according to the one-dimensional equivalent longitudinal contribution coefficient obtained under the condition of the straight well.

According to a specific embodiment of the present invention, step S1 includes the following steps:

S11: a formation gamma-ray received by the detector is equivalent to a formation gamma-ray intensity in a spherical space from an effective detection radius $r_0$ of the gamma detector to obtain a gamma-ray flux of the formation received by the detector; and S12: in an effective detection radius $r_0$ space of the gamma detector, a gamma-ray contribution coefficient of a formation at a distance of z from the center of the detector along a well axis under the condition of the straight well is obtained.

According to a specific embodiment of the present invention, step S11 includes the following processes:

for an infinitely large uniform formation, it is assumed that a gamma source intensity density of the formation is $I_0$ and an average attenuation coefficient of gamma-rays passing through the formation is $\mu$;

by considering the gamma detector as a point crystal, a spherical coordinate system with the center of the detector as the origin is established, where a distance between the formation and the origin is R; and according to the following formula of a natural gamma-ray flux of a certain point in the infinitely large uniform formation in the spherical coordinate system, the gamma-ray flux of the formation received by the gamma detector is obtained:

$$J_R = \frac{I_0}{\mu}(1 - e^{-\mu R})$$

according to the average attenuation coefficient $\mu$ of gamma-rays passing through the formation, a radius $r_0$ when the gamma-ray flux reaches 99% of a gamma-ray flux corresponding to the infinitely large formation is obtained, and taken as the effective detection radius of the gamma detector; and the distance between the infinitely large formation and the origin tends to infinity, at this time, a limit value of the gamma-ray flux is $I_0/\mu$;

where, $I_0$ refers to the gamma source intensity density of the formation, unit: number of photons·cm$^{-3}$;

$\mu$ refers to the average linear attenuation coefficient of gamma-rays passing through the formation, unit: cm$^{-1}$;

R is the distance between the formation and the origin, unit: cm; and $J_R$ refers to the gamma-ray flux of the formation received by the detector, unit: number of photons·cm$^{-2}$.

According to a specific embodiment of the present invention, step S12 includes the following processes:

under the condition of the straight well, in the case that the formation is considered to be in the shape of a parallel slab, a scintillator in the gamma-ray detector is considered to be in the shape of a point and coincides with the center of the detector, and the influence of a wellbore environment and the outer wall of the instrument is ignored, a cylindrical coordinate system with the center of the gamma detector as the origin is established;

within the effective detection radius $r_0$ of the gamma detector, a formation at a vertical distance of z from the center of the gamma detector along the well axis is considered as an infinitely thin slab surface source perpendicular to the well axis;

the surface source is divided into several sector differentials ds with the well axis as the center, where the contribution of the sector differential ds to the gamma-ray flux at the center of the gamma detector is as follows:

$$d\phi_{r_0 z} = \frac{I_0}{4\pi(r^2 + z^2)} e^{-\mu\sqrt{(r^2+z^2)}} ds = \frac{I_0}{4\pi(r^2 + z^2)} e^{-\mu\sqrt{(r^2+z^2)}} r \, dr \, d\varphi$$

so in the effective detection space $r_0$, the gamma-ray flux of the surface source of the formation (at a distance of z from the center of the detector along the well axis) to the detector is expressed as follows:

$$\phi_{r_0z} = \frac{I_0}{2}\int_{\mu z}^{\mu r_0}\frac{e^{-t}}{t}dt$$

a gamma-ray flux $\Phi_z$ of the thin slab surface source of the infinitely large formation (at a distance of z from the center of the gamma detector along the well axis) to the gamma detector in the infinitely large space is replaced with the above formula:

$$\phi_z = \frac{I_0}{2}\int_0^{\frac{\pi}{2}}e^{-\mu z \sec\theta}\tan\theta d\theta$$

the contribution coefficient varying with the distance between the formation and the detector in the effective detection space is equivalent to the contribution coefficient varying with the distance between the formation and the detector in the infinitely large integral space, and the contribution coefficient varying with the distance between the formation and the detector in a finitely large integral space is taken as the one-dimensional equivalent longitudinal contribution coefficient (varying with the distance between the formation and the detector) of the gamma-ray flux received by the gamma detector;

where, $I_0$ refers to the gamma source intensity density of the formation, unit: number of photons·cm$^{-3}$;

$d_s$ refers to the sector differential in the surface source of the formation at a vertical distance of z from the center of the gamma detector along the well axis;

$\mu$ refers to the average linear attenuation coefficient of gamma-rays passing through the formation, unit: cm$^{-1}$;

r refers to a distance between the sector differential in the formation and the well axis, unit: cm;

$\theta$ is an included angle between a line of connecting a certain point on a circle with the well axis as the center and with a radius of r to the center O of the gamma detector and the well axis from the center of the gamma detector to the surface source of the infinitely thin slab formation at a distance of z from the center of the gamma detector along the well axis; and $\varphi$ refers to an included angle between a certain point with a radius vector of r and an X axis in the cylindrical coordinate system, and $d\varphi$ refer to a differential thereof.

Figure 1:
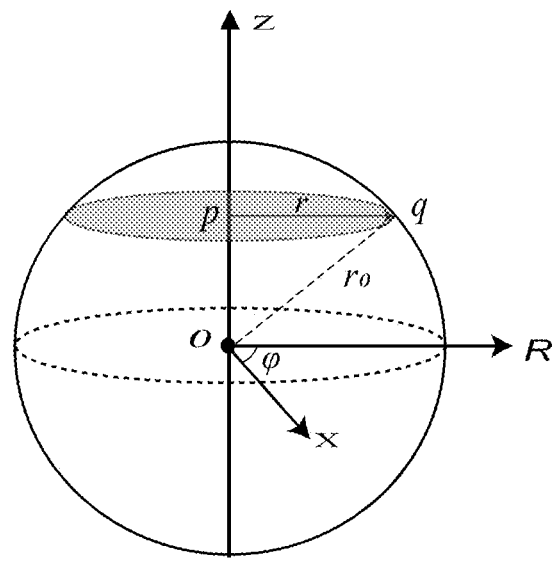
FIG. 1 is a one-dimensional equivalent longitudinal contribution coefficient calculation model diagram of a slab formation model in an effective detection space provided by the present invention.
Figure 2:
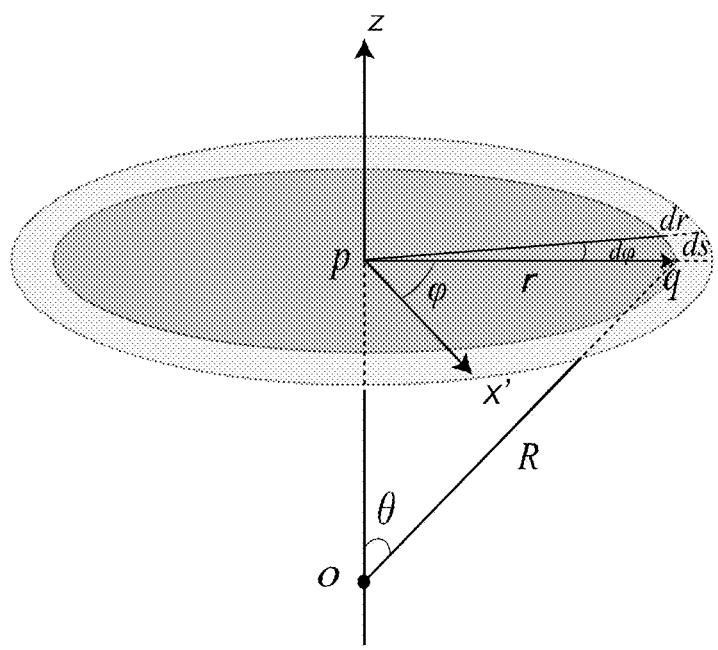
FIG. 2 is a longitudinal contribution coefficient calculation model diagram of a slab formation model in an infinitely large integral space provided by the present invention.

According to a specific embodiment of the present invention, step S12 includes the following processes:

under the condition of the straight well, in the case that the formation is considered to be in the shape of a parallel slab, a scintillator in the gamma-ray detector is considered to be in the shape of a point and coincides with the center of the detector, and the influence of a wellbore environment and the outer wall of the instrument is ignored, a cylindrical coordinate system with the center of the gamma detector as the origin is established;

it is assumed that a gamma source intensity density of the formation is $I_0$ and an effective detection radius of the gamma detector is $r_0$;

within the effective detection radius $r_0$, the formation at a vertical distance of z from the center of the gamma detector along the well axis is considered as an infinitely thin slab surface source perpendicular to the well axis, and the surface source is divided into several sector differential elements $ds=rd\varphi dr$ with the well axis as the center, where the slab surface source refers to that the formation is considered to be a differential unit composed of several infinitely thin slab radioactive sources along the normal direction of the formation, and ds is a sector differential of the surface source of the formation; and the geometric meaning is shown in FIGS. 1 and 2;

r is a distance between the sector differential element in the surface source and the well axis, and the value range of r is $0\sim\sqrt{r_0^2-z^2}$;

the contribution of the sector differential ds to the gamma-ray flux at the center of the gamma detector is as follows:

$$d\phi_{r_0z} = \frac{I_0}{4\pi(r^2+z^2)}e^{-\mu\sqrt{(r^2+z^2)}}ds = \frac{I_0}{4\pi(r^2+z^2)}e^{-\mu\sqrt{(r^2+z^2)}}rdrd\varphi$$

so the natural gamma flux of the surface source (at a vertical distance of z from the well axis to the center of the detector) at the center of the gamma detector is:

$$\phi_{r_0z} = \frac{1}{4\pi}\int_0^{2\pi}\int_0^{\sqrt{r_0^2-z^2}}\frac{I_0}{r^2+z^2}e^{-\mu\sqrt{r^2+z^2}}rdrd\varphi = \frac{1}{2}\int_0^{\sqrt{r_0^2-z^2}}\frac{I_0}{r^2+z^2}e^{-\mu\sqrt{r^2+z^2}}rdr$$

in case of setting $t=\mu\sqrt{r^2+z^2}$, the above formula is converted to:

$$\phi_{r_0z} = \frac{I_0}{2}\int_{\mu z}^{\mu r_0}\frac{e^{-t}}{t}dt$$

the formula is the gamma-ray flux of the surface source of the thin slab formation at a distance of z from the center of the detector along the well axis to the detector in the effective detection space $r_0$. The gamma-ray flux of the thin slab surface source of the infinitely large formation (at a distance of z from the center of the gamma detector along the well axis) to the detector in the infinitely large space is replaced with the formula:

$$\phi_z = \frac{I_0}{2}\int_0^{\frac{\pi}{2}}e^{-\mu z \sec\theta}\tan\theta d\theta$$

where $\theta$ is an included angle between a line of connecting a certain point on a circle with the well axis as the center and with a radius of r to the center O of the gamma detector and the well axis from the center of the gamma detector to the surface source of the infinitely thin slab formation at a distance of z from the center of the gamma detector along the well axis;

under the condition of a straight well, the contribution coefficient varying with the distance between the formation and the detector in the effective detection space is equivalent to the contribution coefficient varying with the distance between the formation and the detector in the infinitely large integral space, and the contribution coefficient varying with the distance between the formation and the detector in a finitely large integral space is taken as the one-dimensional equivalent longitudinal contribution coefficient (varying with the distance between the formation and the detector) of the gamma-ray flux received by the gamma detector;

where, $I_0$ refers to the gamma source intensity density of the formation, unit: number of photons·cm$^{-3}$;

$d_s$ refers to the sector differential in the surface source of the formation at a vertical distance of z from the center of the gamma detector along the well axis;

z refers to the distance between the formation and the center of the gamma detector along the well axis, unit: cm$^{-1}$;

φ refers to an included angle between a certain point with a radius vector of r and an X axis in the cylindrical coordinate system, and dφ refer to a differential thereof;

$d\Phi_{r_0 z}$ is the gamma-ray flux of the sector differential in the surface source (at a vertical distance of z from the center of the gamma detector along the well axis) to the center of the gamma detector within the detection radius $r_0$;

$\Phi_{r_0 z}$ is the natural gamma flux of the surface source (at a vertical distance of z from the center of the detector along the well axis) at the center of the gamma detector within the detection radius $r_0$;

$\Phi_z$ is the natural gamma-ray flux of the surface source (at a vertical distance of z from the center of the detector along the well axis) of the infinitely large formation at the center of the gamma detector;

According to a specific embodiment of the present invention, step S1 further includes step S13 implemented by further obtaining a fitting formula of the one-dimensional equivalent longitudinal contribution coefficient.

According to a specific embodiment of the present invention, the further obtaining a fitting formula of the one-dimensional equivalent longitudinal contribution coefficient is specifically implemented by: step S13: function fitting is performed on numerical integral calculation results in the effective detection space, and a bilateral function fitting expression of the one-dimensional equivalent longitudinal contribution coefficient is obtained by using a double exponential model.

According to a specific embodiment of the present invention, in step S13, the bilateral function fitting expression of the one-dimensional equivalent longitudinal contribution coefficient is obtained by using a double exponential model is specifically implemented by: the one-dimensional equivalent longitudinal contribution coefficient is fitted in the following manner:

the gamma-ray source intensity density $I_0$ of the formation is normalized to obtain a double-exponential function fitting model:

$$g_z = Ae^{bz} + Ce^{dz}$$

where A, C, b and d are fitting coefficients;

a natural gamma flux of the surface source (at a vertical distance of z from the center of the detector along the well axis) at the center of the gamma detector is calculated in the effective detection space by using the double-exponential function fitting model, and normalized, such that the sum of the natural gamma-ray fluxes $g_z$ of the surface sources (at different distances from the center of the detector along the well axis) at the center of the gamma-ray detector is 1, and then the one-dimensional equivalent longitudinal contribution coefficient is obtained.

According to a specific embodiment of the present invention, step S2 includes the following steps:

step S21: an equivalent detection sphere whose radius is the effective detection radius $r_0$ of the gamma detector is constructed by taking a current detection point as the center of the sphere, and an effective gamma-ray flux contribution area of the current detection point is determined; and step S22: when the wellbore is perpendicular to the formation, an equivalent integral under the condition of the straight well is directly adopted; and when an included angle between the wellbore and the formation is less than 90°, in an effective gamma-ray flux contribution space, the integral of the gamma-ray flux received by the detector under the condition of the deviated well is converted into the equivalent integral under the condition of the straight well;

where the equivalent integral under the condition of the straight well is obtained by using the one-dimensional equivalent longitudinal contribution coefficient to perform weighted accumulation on the gamma-ray fluxes of the formations at different distances from the center of the gamma detector within the effective detection range.

According to a specific embodiment of the present invention, step S22 specifically includes the following steps:

a vertical distance between the current detection point and each formation interface is calculated, contribution coefficients of the formations at different distances from the detection point to an integral of the gamma-ray flux of the current point are obtained by using the double-exponential function fitting model in step S13, and weighted integration is performed on the gamma-ray fluxes of the formations at different distances from the detection point along the normal direction of the formation by using the contribution coefficients to obtain a gamma-ray flux of the detection point.

The present invention further provides a fast forward system for gamma-ray logging of highly-deviated and horizontal wells, which performs fast forward for gamma-ray logging of highly-deviated and horizontal wells by using any one of the above fast forward methods for gamma-ray logging of highly-deviated and horizontal wells, and includes the following modules:

a logging condition determination module, configured to determine intersection situations of a logging record point and a formation boundary, and determine whether a logged well is a straight well or a deviated well;

a gamma-ray equivalent longitudinal coefficient determination module under the condition of the straight well, configured to, based on an effective detection space of a gamma detector, in the effective detection space, obtain a one-dimensional longitudinal equivalent contribution coefficient (varying with a distance between a formation and the detector) of a gamma-ray flux received by the detector under the condition of the straight well;

a conversion module for integrals of gamma-ray fluxes, configured to convert an integral of the gamma-ray flux received by the detector under the condition of the deviated well into an equivalent integral of a gamma-ray under the condition of the straight well; and a forward module, configured to calculate a forward value of each measurement point.

Embodiment 1

According to a specific embodiment of the present invention, a fast forward method for gamma-ray logging of highly-deviated and horizontal wells in the present invention will be described in detail below.

The present invention provides a fast forward method for gamma-ray logging of highly-deviated and horizontal wells, which includes the following steps:

step S1: based on an effective detection space of a gamma detector, a one-dimensional equivalent longitudinal contribution coefficient (varying with a distance between a formation and the detector) of a gamma-ray flux received by the gamma detector under the condition of a straight well is obtained in the effective detection space;

step S2: an integral of a gamma-ray flux received by the detector under the condition of a deviated well is converted into an equivalent integral of the gamma-ray flux in a same contribution space under the condition of the straight well; and step S3: fast forward for gamma-ray logging of highly-deviated and horizontal wells under the condition of parallel sedimentary formations is performed by using the obtained equivalent integral under the condition of the straight well, and then a forward value of a measurement point is obtained according to the one-dimensional equivalent longitudinal contribution coefficient, where the deviated well refers to a well whose wellbore is non-orthogonal to the formation, and the straight well refers to a well whose wellbore is orthogonal to the formation.

Embodiment 2

According to a specific embodiment of the present invention, a fast forward method for gamma-ray logging of highly-deviated and horizontal wells in the present invention will be described in detail below.

The present invention provides a fast forward method for gamma-ray logging of highly-deviated and horizontal wells, which includes the following steps:

step S1: based on an effective detection space of a gamma detector, a one-dimensional equivalent longitudinal contribution coefficient (varying with a distance between a formation and the detector) of a gamma-ray flux received by the gamma detector under the condition of a straight well is obtained in the effective detection space;

step S2: an integral of a gamma-ray flux received by the detector under the condition of a deviated well is converted into an equivalent integral of the gamma-ray flux in a same contribution space under the condition of the straight well; and step S3: fast forward for gamma-ray logging of highly-deviated and horizontal wells under the condition of parallel sedimentary formations is performed by using the obtained equivalent integral under the condition of the straight well, and then a forward value of a measurement point is obtained according to the one-dimensional equivalent longitudinal contribution coefficient, where the deviated well refers to a well whose wellbore is non-orthogonal to the formation, and the straight well refers to a well whose wellbore is orthogonal to the formation.

where step S1 includes the following steps:

S11: a formation gamma-ray received by the detector is equivalent to a formation gamma-ray in a spherical space from an effective detection radius $r_0$ of the gamma detector to obtain a gamma-ray flux of the formation received by the detector; and S12: in an effective detection radius $r_0$ space of the gamma detector, a gamma-ray contribution coefficient of a formation at a distance of z from the center of the detector along a well axis under the condition of the straight well is obtained.

Embodiment 3

According to a specific embodiment of the present invention, a fast forward method for gamma-ray logging of highly-deviated and horizontal wells in the present invention will be described in detail below.

The present invention provides a fast forward method for gamma-ray logging of highly-deviated and horizontal wells, which includes the following steps:

step S1: based on an effective detection space of a gamma detector, a one-dimensional equivalent longitudinal contribution coefficient (varying with a distance between a formation and the detector) of a gamma-ray flux received by the gamma detector under the condition of a straight well is obtained in the effective detection space;

step S2: an integral of a gamma-ray flux received by the detector under the condition of a deviated well is converted into an equivalent integral of the gamma-ray flux in a same contribution space under the condition of the straight well; and step S3: fast forward for gamma-ray logging of highly-deviated and horizontal wells under the condition of parallel sedimentary formations is performed by using the obtained equivalent integral under the condition of the straight well, and then a forward value of a measurement point is obtained according to the one-dimensional equivalent longitudinal contribution coefficient, where the deviated well refers to a well whose wellbore is non-orthogonal to the formation, and the straight well refers to a well whose wellbore is orthogonal to the formation.

where step S1 includes the following steps:

S11: a formation gamma-ray received by the detector is equivalent to a formation gamma-ray intensity in a spherical space from an effective detection radius $r_0$ of the gamma detector to obtain a gamma-ray flux of the formation received by the detector; and S12: in an effective detection radius $r_0$ space of the gamma detector, a gamma-ray contribution coefficient of a formation at a distance of z from the center of the detector along a well axis under the condition of the straight well is obtained.

where step S11 includes the following processes:

for an infinitely large uniform formation, it is assumed that a gamma source intensity density of the formation is $I_0$ and an average linear attenuation coefficient of gamma-rays passing through the formation is $\mu$;

by considering the gamma detector as a point crystal, a spherical coordinate system with the center of the detector as the origin is established, where a distance between the formation and the origin is R; and according to the following formula of a natural gamma-ray flux of a certain point in the infinitely large uniform formation in the spherical coordinate system, the gamma-ray flux of the formation received by the gamma detector is obtained:

$$J_R = \frac{I_0}{\mu}\left(1 - e^{-\mu R}\right)$$

according to the average linear attenuation coefficient µ of gamma-rays passing through the formation, a radius $r_0$ when the gamma-ray flux reaches 99% of a gamma-ray flux corresponding to the infinitely large formation is obtained, and taken as the effective detection radius of the gamma detector; and the distance between the infinitely large formation and the origin tends to infinity, at this time, a limit value of the gamma-ray flux is $I_0/\mu$;

where, $I_0$ refers to the gamma source intensity density of the formation, unit: number of photons·cm$^{-3}$;

µ refers to the average linear attenuation coefficient of gamma-rays passing through the formation, unit: cm$^{-1}$;

R is the distance between the formation and the origin, unit: cm; and $J_R$ refers to the gamma-ray flux of the formation received by the detector, unit: number of photons·cm$^{-2}$.

Step S12 includes the following steps:

under the condition of the straight well, in the case that the formation is considered to be in the shape of a parallel slab, a scintillator in the gamma-ray detector is considered to be in the shape of a point and coincides with the center of the detector, and the influence of a wellbore environment and the outer wall of the instrument is ignored, a cylindrical coordinate system with the center of the gamma detector as the origin is established;

within the effective detection radius $r_0$ of the gamma detector, a formation at a vertical distance of z from the center of the gamma detector along the well axis is considered as an infinitely thin slab surface source perpendicular to the well axis;

the surface source is divided into several sector differentials ds with the well axis as the center, where the contribution of the sector differential ds to the gamma-ray flux at the center of the gamma detector is as follows:

$$d\phi_{r_0 z} = \frac{I_0}{4\pi(r^2+z^2)} e^{-\mu\sqrt{(r^2+z^2)}} ds = \frac{I_0}{4\pi(r^2+z^2)} e^{-\mu\sqrt{(r^2+z^2)}} r dr d\varphi$$

so in the effective detection space $r_0$, the gamma-ray flux of the surface source of the formation (at a distance of z from the center of the detector along the well axis) to the detector is expressed as follows:

$$\phi_{r_0 z} = \frac{I_0}{2} \int_{\mu z}^{\mu r_0} \frac{e^{-t}}{t} dt$$

a gamma-ray flux $\Phi_z$ of the thin slab surface source of the infinitely large formation (at a distance of z from the center of the gamma detector along the well axis) to the gamma detector in the infinitely large space is replaced with the above formula:

$$\phi_z = \frac{I_0}{2} \int_0^{\frac{\pi}{2}} e^{-\mu z \sec\theta} \tan\theta d\theta$$

under the condition of a straight well, the contribution coefficient varying with the distance between the formation and the detector in the effective detection space is equivalent to the contribution coefficient varying with the distance between the formation and the detector in the infinitely large integral space, and the contribution coefficient varying with the distance between the formation and the detector in a finitely large integral space is taken as the one-dimensional equivalent longitudinal contribution coefficient (varying with the distance between the formation and the detector) of the gamma-ray flux received by the gamma detector;

where, $I_0$ refers to the gamma source intensity density of the formation, unit: number of photons·cm$^{-3}$;

$d_s$ refers to the sector differential in the surface source of the formation at a vertical distance of z from the center of the gamma detector along the well axis;

µ refers to the average linear attenuation coefficient of gamma-rays passing through the formation, unit: cm$^{-1}$;

r refers to a distance between the sector differential in the formation and the well axis, unit: cm;

θ is an included angle between a line of connecting a certain point on a circle with the well axis as the center and with a radius of r to the center O of the gamma detector and the well axis from the center of the gamma detector to the surface source of the infinitely thin slab formation (at a distance of z from the center of the gamma detector along the well axis);

φ refers to an included angle between a certain point with a radius vector of r and an X axis in the cylindrical coordinate system, and dφ refer to a differential thereof.

Embodiment 4

According to a specific embodiment of the present invention, a fast forward method for gamma-ray logging of highly-deviated and horizontal wells in the present invention will be described in detail below.

The present invention provides a fast forward method for gamma-ray logging of highly-deviated and horizontal wells, which includes the following steps:

step S1: based on an effective detection space of a gamma detector, a one-dimensional equivalent longitudinal contribution coefficient (varying with a distance between a formation and the center of the detector) of a gamma-ray flux received by the gamma detector under the condition of a straight well is obtained in the effective detection space;

step S2: an integral of a gamma-ray flux received by the detector under the condition of a deviated well is converted into an equivalent integral of the gamma-ray flux in a same contribution space under the condition of the straight well; and step S3: fast forward for gamma-ray logging of highly-deviated and horizontal wells under the condition of parallel sedimentary formations is performed by using the obtained equivalent integral under the condition of the straight well, and then a forward value of a measurement point is obtained according to the one-dimensional equivalent longitudinal contribution coefficient, where the deviated well refers to a well whose wellbore is non-orthogonal to the formation, and the straight well refers to a well whose wellbore is orthogonal to the formation.

Step S1 includes the following steps:

S11: a formation gamma-ray received by the detector is equivalent to a formation gamma-ray intensity in a spherical space from an effective detection radius $r_0$ of the gamma detector to obtain a gamma-ray flux of the formation received by the detector; and S12: in an effective detection radius $r_0$ space of the gamma detector, a gamma-ray contribution coefficient of a formation at a distance of z from the center of the detector along a well axis under the condition of the straight well is obtained; and step S13: a bilateral function fitting expression of the one-dimensional equivalent longitudinal contribution coefficient is obtained by using a double exponential model;

where step S11 includes the following processes:

for an infinitely large uniform formation, it is assumed that a gamma source intensity density of the formation is $I_0$, and an average linear attenuation coefficient of gamma-rays passing through the formation is $\mu$;

by considering the gamma detector as a point crystal, a spherical coordinate system with the center of the detector as the origin is established, where a distance between the formation and the origin is R; and according to the following formula of a natural gamma-ray flux of a certain point in the infinitely large uniform formation in the spherical coordinate system, the gamma-ray flux of the formation received by the gamma detector is obtained:

$$J_R = \frac{I_0}{\mu}(1 - e^{-\mu R})$$

according to the average linear attenuation coefficient $\mu$ of gamma-rays passing through the formation, a radius $r_0$ when the gamma-ray flux reaches 99% of a gamma-ray flux corresponding to the infinitely large formation is obtained, and taken as the effective detection radius of the gamma detector; and the distance between the infinitely large formation and the origin tends to infinity, at this time, a limit value of the gamma-ray flux is $I_{0/\mu}$;

where, $I_0$ refers to the gamma source intensity density of the formation, unit: number of photons·cm$^{-3}$;

$\mu$ refers to the average linear attenuation coefficient of gamma-rays passing through the formation, unit: cm$^{-1}$;

R is the distance between the formation and the origin, unit: cm; and $J_R$ refers to the gamma-ray flux of the formation received by the detector, unit: number of photons·cm$^{-2}$.

Step S12 includes the following steps:

under the condition of the straight well, in the case that the formation is considered to be in the shape of a parallel slab, a scintillator in the gamma-ray detector is considered to be in the shape of a point and coincides with the center of the detector, and the influence of a wellbore environment and the outer wall of the instrument is ignored, a cylindrical coordinate system with the center of the gamma detector as the origin is established;

within the effective detection radius $r_0$ of the gamma detector, a formation at a vertical distance of z from the center of the gamma detector along the well axis is considered as an infinitely thin slab surface source perpendicular to the well axis;

the surface source is divided into several sector differentials ds with the well axis as the center, where the contribution of the sector differential ds to the gamma-ray flux at the center of the gamma detector is as follows:

$$d\phi_{r_0z} = \frac{I_0}{4\pi(r^2+z^2)}e^{-\mu\sqrt{(r^2+z^2)}}ds = \frac{I_0}{4\pi(r^2+z^2)}e^{-\mu\sqrt{(r^2+z^2)}}rdrd\varphi$$

so in the effective detection space $r_0$, the gamma-ray flux of the thin slab surface source of the formation at a distance of z from the center of the detector along the well axis to the detector is expressed as follows:

$$\phi_{r_0z} = \frac{I_0}{2}\int_{\mu z}^{\mu r_0}\frac{e^{-t}}{t}dt$$

a gamma-ray flux $\Phi_z$ of the thin slab surface source of the infinitely large formation (at a distance of z from the center of the gamma detector along the well axis) to the gamma detector in the infinitely large space is replaced with the above formula:

$$\phi_z = \frac{I_0}{2}\int_0^{\frac{\pi}{2}}e^{-\mu z \sec\theta}\tan\theta d\theta$$

under the condition of the straight well, the contribution coefficients of the formations at different distances from the detector in the effective detection space are equivalent to the contribution coefficient varying with the distance between the formation and the detector in the infinitely large integral space, and the contribution coefficient varying with the distance between the formation and the detector in a finitely large integral space is taken as the one-dimensional equivalent longitudinal contribution coefficient (varying with the distance between the formation and the detector) of the gamma-ray flux received by the gamma detector;

where, $I_0$ refers to the gamma source intensity density of the formation, unit: number of photons·cm$^{-3}$;

$d_s$ refers to the sector differential in the surface source of the formation at a vertical distance of z from the center of the gamma detector along the well axis;

$\mu$ refers to the average linear attenuation coefficient of gamma-rays passing through the formation, unit: cm$^{-1}$;

r refers to a distance between the sector differential in the formation and the well axis, unit: cm;

$\theta$ is an included angle between a line of connecting a certain point on a circle with the well axis as the center and with a radius of r to the center O of the gamma detector and the well axis from the center of the gamma detector to the surface source of the infinitely thin slab formation (at a distance of z from the center of the gamma detector along the well axis); and $\varphi$ refers to an included angle between a certain point with a radius vector of r and an X axis in the cylindrical coordinate system, and $d\varphi$ refer to a differential thereof.

Where in step S13 that a bilateral function fitting expression of the one-dimensional equivalent longitudinal contribution coefficient is obtained by using a double exponential model is specifically implemented by: the one-dimensional equivalent longitudinal contribution coefficient is fit in the following manner:

the gamma-ray source intensity density $I_0$ of the formation is normalized to obtain a double-exponential function fitting model:

$$g_z = Ae^{bz} + Ce^{dz}$$

where A, C, b and d are fitting coefficients;

a natural gamma flux of the surface source (at a vertical distance of z from the center of the detector along the well axis) at the center of the gamma detector is calculated in the effective detection space by using the double-exponential function fitting model, and normalized, such that the sum of the natural gamma-ray fluxes $g_z$ of the surface sources (at different vertical distances of z from the center of the detector along the well axis) at the center of the gamma-ray detector is 1, and then the one-dimensional equivalent longitudinal contribution coefficient is obtained.

Embodiment 5

According to a specific embodiment of the present invention, a fast forward method for gamma-ray logging of highly-deviated and horizontal wells in the present invention will be described in detail below.

The present invention provides a fast forward method for gamma-ray logging of highly-deviated and horizontal wells, which includes the following steps:

step S1: based on an effective detection space of a gamma detector, a one-dimensional equivalent longitudinal contribution coefficient (varying with a distance between a formation and the detector) of a gamma-ray flux received by the gamma detector under the condition of a straight well is obtained in the effective detection space;

step S2: an integral of a gamma-ray flux received by the detector under the condition of a deviated well is converted into an equivalent integral of the gamma-ray flux in a same contribution space under the condition of the straight well; and step S3: fast forward for gamma-ray logging of highly-deviated and horizontal wells under the condition of parallel sedimentary formations is performed by using the obtained equivalent integral under the condition of the straight well, and then a forward value of a measurement point is obtained according to the one-dimensional equivalent longitudinal contribution coefficient, where the deviated well refers to a well whose wellbore is non-orthogonal to the formation, and the straight well refers to a well whose wellbore is orthogonal to the formation.

where step S1 includes the following steps:

S11: a formation gamma-ray received by the detector is equivalent to a formation gamma-ray intensity in a spherical space from an effective detection radius $r_0$ of the gamma detector to obtain a gamma-ray flux of the formation received by the detector; and S12: in an effective detection radius $r_0$ space of the gamma detector, a gamma-ray contribution coefficient of a formation at a distance of z from the center of the detector along a well axis under the condition of the straight well is obtained; and step S13: a bilateral function fitting expression of the one-dimensional equivalent longitudinal contribution coefficient is obtained by using a double exponential model;

where step S11 includes the following processes:

for an infinitely large uniform formation, it is assumed that a gamma source intensity density of the formation is $I_0$ and an average linear attenuation coefficient of gamma-rays passing through the formation is $\mu$;

by considering the gamma detector as a point crystal, a spherical coordinate system with the center of the detector as the origin is established, where a distance between the formation and the origin is R; and according to the following formula of a natural gamma-ray flux of a certain point in the infinitely large uniform formation in the spherical coordinate system, the gamma-ray flux of the formation received by the gamma detector is obtained:

$$J_R = \frac{I_0}{\mu}(1 - e^{-\mu R})$$

according to the average linear attenuation coefficient $\mu$ of gamma-rays passing through the formation, a radius $r_0$ when the gamma-ray flux reaches 99% of a gamma-ray flux corresponding to the infinitely large formation is obtained, and taken as the effective detection radius of the gamma detector; and the distance between the infinitely large formation and the origin tends to infinity, at this time, a limit value of the gamma-ray flux is $I_{0/\mu}$;

where $I_0$ refers to the gamma source intensity density of the formation, unit: number of photons·cm$^{-3}$;

$\mu$ refers to the average linear attenuation coefficient of gamma-rays passing through the formation, unit: cm$^{-1}$;

R is the distance between the formation and the origin, unit: cm; and $J_R$ refers to the gamma-ray flux of the formation received by the detector, unit: number of photons·cm$^{-2}$.

where step S12 includes the following steps:

under the condition of the straight well, in the case that the formation is considered to be in the shape of a parallel slab, a scintillator in the gamma-ray detector is considered to be in the shape of a point and coincides with the center of the detector, and the influence of a wellbore environment and the outer wall of the instrument is ignored, a cylindrical coordinate system with the center of the gamma detector as the origin is established;

within the effective detection radius $r_0$ of the gamma detector, a formation at a vertical distance of z from the center of the gamma detector along the well axis is considered as an infinitely thin slab surface source perpendicular to the well axis;

the surface source is divided into several sector differentials ds with the well axis as the center, where the contribution of the sector differential ds to the gamma-ray flux at the center of the gamma detector is as follows:

$$d\phi_{r_0z} = \frac{I_0}{4\pi(r^2+z^2)}e^{-\mu\sqrt{r^2+z^2}}ds = \frac{I_0}{4\pi(r^2+z^2)}e^{-\mu\sqrt{r^2+z^2}}rdrd\varphi$$

so in the effective detection space $r_0$, the gamma-ray flux of the formation at a distance of z from the center of the detector along the well axis to the detector is expressed as follows:

$$\phi_{r_0z} = \frac{I_0}{2}\int_{\mu z}^{\mu r_0} \frac{e^{-t}}{t}dt$$

a gamma-ray flux $\Phi_z$ of the thin slab surface source of the infinitely large formation (at a distance of z from the center of the gamma detector along the well axis) to the gamma detector in the infinitely large space is replaced with the above formula:

$$\phi_z = \frac{I_0}{2} \int_0^{\frac{\pi}{2}} e^{-\mu z \sec\theta} \tan\theta d\theta$$

the contribution coefficient varying with the distance between the formation and the center of the detector in the effective detection space is used to be equivalent to the contribution coefficient varying with the distance between the formation and the center of the detector in the infinitely large integral space, and the contribution coefficient varying with the distance between the formation and the center of the detector in a finitely large integral space is taken as the one-dimensional equivalent longitudinal contribution coefficient (varying with the distance between the formation and the detector) of the gamma-ray flux received by the gamma detector;

where, $I_0$ refers to the gamma source intensity density of the formation, unit: number of photons·cm$^{-3}$;

$d_s$ refers to the sector differential in the surface source of the formation at a vertical distance of z from the center of the gamma detector along the well axis;

μ refers to the average linear attenuation coefficient of gamma-rays passing through the formation, unit: cm$^{-1}$;

r refers to a distance between the sector differential in the formation and the well axis, unit: cm;

θ is an included angle between a line of connecting a certain point on a circle with an intersection point of the well axes as the center and with a radius of r to the center O of the gamma detector and the well axis from the center of the gamma detector to the surface source of the infinitely thin slab formation (at a distance of z from the center of the gamma detector along the well axis); and φ refers to an included angle between a certain point with a radius vector of r and an X axis in the cylindrical coordinate system, and dφ refer to a differential thereof.

Where in step S13 that a bilateral function fitting expression of the one-dimensional equivalent longitudinal contribution coefficient is obtained by using a double exponential model is specifically implemented by: the one-dimensional equivalent longitudinal contribution coefficient is fitted in the following manner:

the gamma-ray source intensity density $I_0$ of the formation is normalized to obtain a double-exponential function fitting model:

$$g_z = Ae^{bz} + Ce^{dz}$$

where A, C, b and d are fitting coefficients;

a natural gamma flux of the surface source (at a vertical distance of z from the center of the detector along the well axis) at the center of the gamma detector is calculated by using the double-exponential function fitting model in the effective detection space, and normalized, such that the sum of the natural gamma-ray fluxes $g_z$ of the surface sources (at different distances from the center of the detector along the well axis) at the center of the gamma-ray detector is 1, and then the one-dimensional equivalent longitudinal contribution coefficient is obtained.

where step S2 includes the following steps:

step S21: an equivalent detection sphere whose radius is the effective detection radius $r_0$ of the gamma detector is constructed by taking a current detection point as the center of the sphere, and an effective gamma-ray flux contribution area of the current detection point is determined; and step S22: when the wellbore is perpendicular to the formation, an equivalent integral under the condition of the straight well is directly adopted; and when an included angle between the wellbore and the formation is less than 90°, in an effective gamma-ray flux contribution space, the integral of the gamma-ray flux received by the detector under the condition of the deviated well is converted into the equivalent integral under the condition of the straight well;

where the equivalent integral under the condition of the straight well is obtained by using the one-dimensional equivalent longitudinal contribution coefficient to perform weighted accumulation on the gamma-ray fluxes of the formations at different distances from the center of the gamma detector within the effective detection range.

Embodiment 6

According to a specific embodiment of the present invention, a fast forward method for gamma-ray logging of highly-deviated and horizontal wells in the present invention will be described in detail below.

Figure 3:
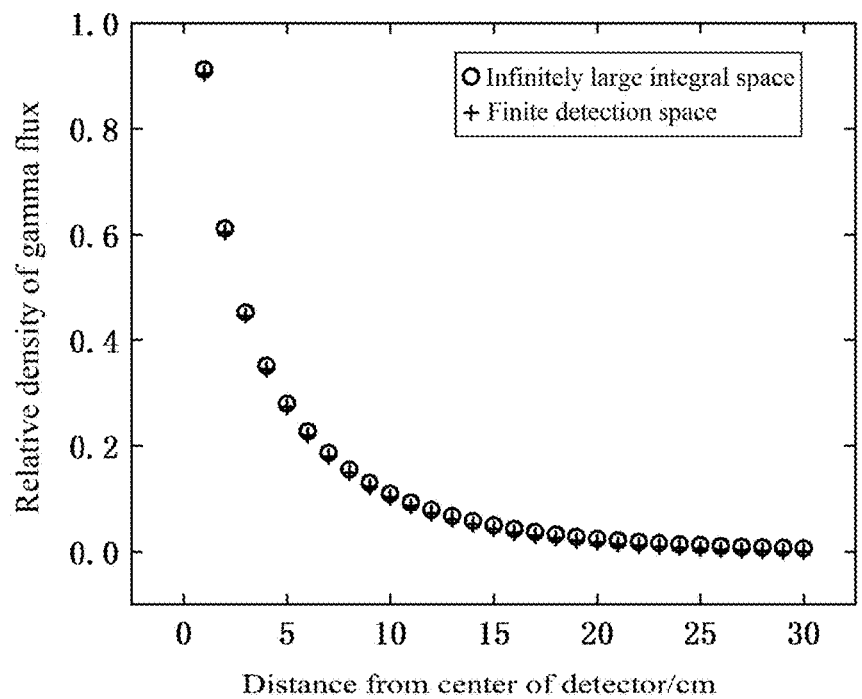
FIG. 3 is a comparison diagram of numerical calculation results of the one-dimensional equivalent longitudinal contribution coefficients in the infinitely large integral space and the effective detection space provided by the present invention.

The present invention provides a fast forward method for gamma-ray logging of highly-deviated and horizontal wells, which includes the following steps:

step S1: based on an effective detection space of a gamma detector, a one-dimensional equivalent longitudinal contribution coefficient (varying with a distance between a formation and the detector) of a gamma-ray flux received by the gamma detector under the condition of a straight well is obtained in the effective detection space;

step S2: an integral of a gamma-ray flux received by the detector under the condition of a deviated well is converted into an equivalent integral of the gamma-ray flux in a same contribution space under the condition of the straight well; and step S3: fast forward for gamma-ray logging of highly-deviated and horizontal wells under the condition of parallel sedimentary formations is performed by using the obtained equivalent integral under the condition of the straight well, and then a forward value of a measurement point is obtained according to the one-dimensional equivalent longitudinal contribution coefficient, where the deviated well refers to a well whose wellbore is non-orthogonal to the formation, and the straight well refers to a well whose wellbore is orthogonal to the formation.

where step S1 includes the following steps:

S11: a formation gamma-ray received by the detector is equivalent to a formation gamma-ray intensity in a spherical space from an effective detection radius $r_0$ of the gamma detector to obtain a gamma-ray flux of the formation received by the detector; and S12: in an effective detection radius $r_0$ space of the gamma detector, a gamma-ray contribution coefficient of a formation at a distance of z from the center of the detector along a well axis under the condition of the straight well is obtained; and step S13: a bilateral function fitting expression of the one-dimensional equivalent longitudinal contribution coefficient is obtained by using a double exponential model;

where step S11 includes the following processes:

for an infinitely large uniform formation, it is assumed that a gamma source intensity density of the formation is $I_0$ and an average linear attenuation coefficient of gamma-rays passing through the formation is μ;

by considering the gamma detector as a point crystal, a spherical coordinate system with the center of the detector as the origin is established, where a distance between the formation and the origin is R; and according to the following formula of a natural gamma-ray flux of a certain point in the infinitely large uniform formation in the spherical coordinate system, the gamma-ray flux of the formation received by the gamma detector is obtained:

$$J_R = \frac{I_0}{\mu}\left(1 - e^{-\mu R}\right)$$

according to the average linear attenuation coefficient μ of gamma-rays passing through the formation, a radius $r_0$ when the gamma-ray flux reaches 99% of a gamma-ray flux corresponding to the infinitely large formation is obtained, and taken as the effective detection radius of the gamma detector; and the distance between the infinitely large formation and the origin tends to infinity, at this time, a limit value of the gamma-ray flux is $I_{0/\mu}$;

where, $I_0$ refers to the gamma source intensity density of the formation, unit: number of photons·cm$^{-3}$;

μ refers to the average linear attenuation coefficient of gamma-rays passing through the formation, unit: cm$^{-1}$;

R is the distance between the formation and the origin, unit: cm; and $J_R$ refers to the gamma-ray flux of the formation received by the detector, unit: number of photons·cm$^{-2}$.

Where step S12 includes the following steps:

under the condition of the straight well, in the case that the formation is considered to be in the shape of a parallel slab, a scintillator in the gamma-ray detector is considered to be in the shape of a point and coincides with the center of the detector, and the influence of a wellbore environment and the outer wall of the instrument is ignored, a cylindrical coordinate system with the center of the gamma detector as the origin is established;

it is assumed that a gamma source intensity density of the formation is $I_0$ and an effective detection radius of the gamma detector is $r_0$;

within the effective detection radius $r_0$, the formation at a vertical distance of z from the center of the gamma detector along the well axis is considered as an infinitely thin slab surface source perpendicular to the well axis, and the surface source is divided into several sector differentials $d_s$—rdφdr with the well axis as the center, as shown in FIG. 2;

r is the radius of the sector differential element located in the surface source from the well axis, and the value range of r is $0 \sim \sqrt{r_0^2 - z^2}$;

the contribution of the sector differential $d_s$ to the gamma-ray flux at the center of the gamma detector is as follows (as shown in FIG. 1):

$$d\phi_{r_0 z} = \frac{I_0}{4\pi(r^2+z^2)} e^{-\mu\sqrt{(r^2+z^2)}} ds = \frac{I_0}{4\pi(r^2+z^2)} e^{-\mu\sqrt{(r^2+z^2)}} rdrd\varphi$$

so the natural gamma flux of the surface source (at a vertical distance of z from the center of the detector along the well axis) at the center of the gamma detector is:

$$\phi_{r_0 z} = \frac{1}{4\pi}\int_0^{2\pi}\int_0^{\sqrt{r_0^2-z^2}} \frac{I_0}{r^2+z^2} e^{-\mu\sqrt{(r^2+z^2)}} rdrd\varphi =$$

$$\frac{1}{2}\int_0^{\sqrt{r_0^2-z^2}} \frac{I_0}{r^2+z^2} e^{-\mu\sqrt{(r^2+z^2)}} rdr$$

in case of setting $t=\mu\sqrt{r^2+z^2}$, the above formula is converted to:

$$\phi_{r_0 z} = \frac{I_0}{2}\int_{\mu z}^{\mu r_0} \frac{e^{-t}}{t} dt$$

the formula is the gamma-ray flux of the surface source of the thin slab formation at a distance of z from the center of the detector along the well axis to the detector in the effective detection space $r_0$. The gamma-ray flux of the thin slab surface source of the infinitely large formation (at a distance of z from the center of the gamma detector along the well axis) to the detector in the infinitely large space is replaced with the formula:

$$\phi_z = \frac{I_0}{2}\int_0^{\frac{\pi}{2}} e^{-\mu z \sec\theta} \tan\theta d\theta$$

where θ is an included angle between a line of connecting a certain point on a circle with the well axis as the center and with a radius of r to the center O of the gamma detector and the well axis from the center of the gamma detector to the infinitely large formation slab surface source at a distance of z from the center of the gamma detector along the well axis;

for common lithologic formations, when the distances between the formations and the detector are the same z, the numerical calculation results of a slab formation model $\Phi_{r_0 z}$ in the effective detection space and a slab formation model $\Phi_z$ in the infinitely large space (as shown in FIG. 3) are compared, and a relative error of the calculation result at each sample point is not more than 0.65%. Therefore, the contribution coefficient varying with the distance between the formation and the detector in the effective detection space can be used to be equivalent to the contribution coefficient varying with the distance between the formation and the detector in the infinitely large integral space.

The contribution coefficient varying with the distance between the formation and the detector in the effective detection space is used to be equivalent to the contribution coefficient varying with the distance between the formation and the detector in the infinitely large integral space, and the contribution coefficient varying with the distance between the formation and the detector in a finitely large integral space is taken as the one-dimensional equivalent longitudinal contribution coefficient (varying with the distance between the formation and the detector) of the gamma-ray flux received by the gamma detector;

where, $I_0$ refers to the gamma source intensity density of the formation, unit: number of photons·cm$^{-3}$;

z refers to a vertical distance from the surface source of the formation along the well axis to the center of the gamma detector, unit: $cm^{-1}$;

$d_s$ refers to the sector differential in the surface source of the formation at a vertical distance of z from the center of the gamma detector along the well axis;

φ refers to an included angle between a certain point with a radius vector of r and an X axis in the cylindrical coordinate system, and dφ refer to a differential thereof;

$d\Phi_{r_0 z}$ is the gamma-ray flux of the sector differential in the surface source (at a vertical distance of z from the center of the gamma detector along the well axis) to the center of the gamma detector within the detection radius $r_0$;

$\Phi_{r_0 z}$ is the natural gamma flux of the surface source (at a vertical distance of z from the center of the detector along the well axis) at the center of the gamma detector within the detection radius $r_0$;

$\Phi_z$ is the natural gamma-ray flux of the surface source (at a vertical distance of zfrom the center of the detector along the well axis) of the infinitely large formation at the center of the gamma detector;

where in step S13 that a bilateral function fitting expression of the one-dimensional equivalent longitudinal contribution coefficient is obtained by using a double exponential model is specifically implemented by: the one-dimensional equivalent longitudinal contribution coefficient is fit in the following manner:

the gamma-ray source intensity density $I_0$ of the formation is normalized to obtain a double-exponential function fitting model:

$$g_z = Ae^{bz} + Ce^{dz}$$

where A, C, b and d are fitting coefficients;

In this embodiment, A=0.8367, b=−0.8207, C=0.6428, d=−0.1821.

FIG. 4(a) shows the results obtained by using the fitting function model and numerical integrals in the effective detection space of the detection radius $r_0$ respectively, and in the figure, the overlaps and differences of the two may be ignored, indicating that the fitting function model is correct.

FIG. 4(b) is a one-dimensional longitudinal equivalent contribution coefficient obtained by calculating and integrating a natural gamma-ray flux $g_z$ of the surface source (at a vertical distance of z from the center of the detector along the well axis) to the detector by using a double-exponential function fitting model in a uniform formation with a true thickness of $2r_0$ and then normalizing the obtained results. Its shape is a bilateral function that is symmetrical about the center of the detector and whose length is twice the detection radius $r_0$.

where step S2 includes the following steps:

step S21: an equivalent detection sphere whose radius is the effective detection radius $r_0$ of the gamma detector is constructed by taking a current detection point as the center of the sphere, and an effective gamma-ray flux contribution area of the current detection point is determined; and step S22: when the wellbore is perpendicular to the formation, an equivalent integral under the condition of the straight well is directly adopted; and when an included angle between the wellbore and the formation is less than 90°, in an effective gamma-ray flux contribution space, the integral of the gamma-ray flux received by the detector under the condition of the deviated well is converted into the equivalent integral under the condition of the straight well;

where the equivalent integral under the condition of the straight well is obtained by using the one-dimensional equivalent longitudinal contribution coefficient to perform weighted accumulation on the gamma-ray fluxes of the formations at different distances from the center of the gamma detector within the effective detection range.

Where step S22 includes the following steps:

a vertical distance between the current detection point and each formation interface is calculated, contribution coefficients of the formations at different distances from the detection point to the gamma-ray flux of the detection point are obtained by using the double-exponential function fitting model in step S13, and weighted integration is performed on the gamma-ray fluxes of the formations at different distances from the detector along the normal direction of the formations by using the contribution coefficients to obtain a gamma-ray flux of the detection point.

FIG. 5 is a schematic diagram of the fast forward steps based on the one-dimensional equivalent longitudinal contribution coefficients, and in the figure, the well axis is non-orthogonal to the formation, A and B are two measurement points on a wellbore trajectory, z' axis is a measurement depth direction of drilling along the well axis, and z axis is a direction of the true thickness of the formation perpendicular downward to the formation interface. With point A as an example, after the effective detection radius $r_0$ is obtained, it is only necessary to calculate the distance of each part of the formation from the detector along the z-axis direction in the figure (the formation interface in FIG. 5 is horizontal), and then the gamma-ray flux of point A can be obtained according to the above steps.

Embodiment 7

According to a specific embodiment of the present invention, a fast forward system for gamma-ray logging of highly-deviated and horizontal wells in the present invention will be described in detail below.

The present invention provides a fast forward system for gamma-ray logging of highly-deviated and horizontal wells, which adopts any of the above-mentioned fast forward methods for gamma-ray logging of highly-deviated and horizontal wells, and includes the following modules:

a logging condition determination module, configured to determine intersection situations of a logging record point and a formation boundary, and determine whether a logged well is a straight well or a deviated well;

a gamma-ray equivalent longitudinal coefficient determination module under the condition of the straight well, configured to, based on an effective detection space of a gamma detector, in the effective detection space, obtain a one-dimensional longitudinal equivalent contribution coefficient (varying with a distance between formation and the detector) of a gamma-ray flux received by detector under the condition of the straight well;

a conversion module for integrals of gamma-ray fluxes, configured to convert an integral of the gamma-ray flux received by the detector under the condition of the deviated well into an equivalent integral of a gamma-ray under the condition of the straight well; and a forward module, configured to calculate a forward value of each measurement point.

Embodiment 8

In order to verify the correctness of simplification of a three-dimensional spherical spatial-division integral algorithm by the present invention, the calculation results of an embodiment of the method of the present invention are compared with the results of the three-dimensional spherical spatial-division integral algorithm in patent ZL201310221099.3. Formation models are set as low and high radioactive formation models, where the low radioactive formation model is set to be 10API in intensity and 40 cm in thickness, the high radioactive formation model is set to be 100API in gamma-ray intensity and 80 cm in thickness, and the effective detection radius $r_0$ is 30 cm. FIG. 6 shows forward response calculation results of gamma-ray logging using two methods when the included angles between the wellbore trajectory and the formation are 60°, 45°, and 30°, respectively. Where, the stepped dotted line refers to a formation gamma-ray intensity model in which the low radioactivity formation is shown on the left side and the high radioactivity formation is shown on the right side. Different line types in FIG. 6 are forward calculation results obtained by using the three-dimensional spherical spatial-division integral algorithm in patent ZL201310221099.3, and scattered points are forward calculation results obtained by using the method of the present invention. It can be seen that within the range of a detection radius, forward curves of gamma-ray logging calculated by using the two methods and have consistent overlap and variation features: as the included angle between the well axis and the formation interface becomes smaller, the steepness of the forward curve becomes gentler, and the apparent formation interface depth sounding obtained becomes larger; when the included angle between the well axis and the formation is 60°, compared with the spherical spatial-division integration method, the method of the present invention has an average relative error of 1.290%; when the included angle between the well axis and the formation is 45°, compared with the spherical spatial-division integration method, the method of the present invention has an average relative error of 0.968%; and when the included angle between the well axis and the formation is 30°, compared with the spherical spatial-division integration method, the method of the present invention has an average relative error of 0.944% and a mean relative error of about 1% (Table 1), thereby verifying the correctness of the method.

TABLE 1

| Included angle between the well axis and the formation | 30° | 45° | 60° |
|---|---|---|---|
| average relative error | 0.944277 | 0.96801227 | 1.290194 |

Embodiment 9

According to a specific embodiment of the present invention, effects will be described in conjunction with the use of a forward example of the method of the present invention.

FIG. 7 is a fast forward example of actual gamma-ray logging-while-drilling in a well, where target formation of the well is a shale gas formation with muddy intercalations. Drilling into the target formation of the well is performed by deflecting from a pilot hole, and once the bottom is touched, pulling back is performed to adjust the trajectory upward. In order to assist in judging the position of the formation interface, a fast forward simulation is performed on the response of gamma logging by using the fast forward algorithm herein. In FIG. 7, logging curves drawn according to the horizontal displacement and vertical depth of the well trajectory are shown at the upper part and on the left side respectively, the lower right area shows the vertical section of the formation model and the well trajectory (the light color refers to the actual drilling trajectory, and the dark color refers to the design trajectory) along the maximum horizontal displacement azimuth of the wellbore. The forward curve is shown in the logging curve area in FIG. 7, where RGR (indicated by dark solid lines) is a measured while drilling (MWD) curve, and FGR (indicated by light dotted lines) is a fast forward curve. It can be seen that by adjusting the formation model, according to the actually drilled wellbore trajectory, the forward curve of gamma-ray logging obtained by using the method of the present invention is basically consistent in shape with the measured curve, and the position of the main formation interface displayed matches the actually measured gamma curve.

The above are merely preferred embodiments of the present invention and are not intended to limit the present invention, and for those skilled in the art, various changes and modifications may be made to the present invention. Any modifications, equivalent substitutions, improvements, and the like within the spirit and principles of the present invention should be included within the scope of protection of the present invention.

The invention claimed is:

1. A fast forward method for gamma-ray logging of highly-deviated and horizontal wells, comprising the following steps:
    step S1: based on an effective detection space of a gamma detector, in the effective detection space, obtaining a one-dimensional equivalent longitudinal contribution coefficient (varying with a distance between a formation and the center of the detector) of a gamma-ray flux received by the gamma detector under the condition of a straight well;
    step S2: converting an integral of a gamma-ray flux received by the detector under the condition of a deviated well into an equivalent integral of the gamma-ray flux of a same space under the condition of the straight well; and
    step S3: performing fast forward for gamma-ray logging of highly-deviated and horizontal wells under the condition of parallel sedimentary formations by using the obtained equivalent integral under the condition of the straight well, and then obtaining a forward value of a measurement point according to the one-dimensional equivalent longitudinal contribution coefficient, where the deviated well refers to a well whose wellbore is non-orthogonal to the formation, and the straight well refers to a well whose wellbore is orthogonal to the formation.

2. The fast forward method for gamma-ray logging of highly-deviated and horizontal wells according to claim 1, wherein step S1 comprises the following steps:
    S11: enabling a formation gamma-ray received by the detector to be equivalent to a formation gamma-ray intensity in a spherical space from an effective detection radius $r_0$ of the gamma detector to obtain a gamma-ray flux of the formation received by the detector; and
    S12: in an effective detection radius $r_0$ space of the gamma detector, obtaining a gamma-ray contribution coefficient of a formation at a distance of z from the center of the detector along a well axis under the condition of the straight well.

3. The fast forward method for gamma-ray logging of highly-deviated and horizontal wells according to claim 2, wherein step S11 comprises the following processes:

for an infinitely large uniform formation, assuming that a gamma source intensity density of the formation is $I_0$ and an average linear attenuation coefficient of gamma-rays passing through the formation is $\mu$;

by considering the gamma detector as a point crystal, establishing a spherical coordinate system with the center of the detector as the origin, where a distance between the formation and the origin is R; and according to the following formula of a natural gamma-ray flux of a certain point in the infinitely large uniform formation in the spherical coordinate system, obtaining the gamma-ray flux of the formation received by the gamma detector:

$$J_R = \frac{I_0}{\mu}\left(1 - e^{-\mu R}\right)$$

according to the average linear attenuation coefficient $\mu$ of gamma-rays passing through the formation, obtaining a radius $r_0$ when the gamma-ray flux reaches 99% of a gamma-ray flux corresponding to the infinitely large formation, and taking $r_0$ as the effective detection radius of the gamma detector; and allowing the distance between the infinitely large formation and the origin to tend to infinity, at this time, a limit value of the gamma-ray flux is $I_0/\mu$;

where, $I_0$ refers to the gamma source intensity density of the formation, unit: number of photons $cm^{-3}$;

$\mu$ refers to the average linear attenuation coefficient of gamma-rays passing through the formation, unit: $cm^{-1}$;

R is the distance between the formation and the origin, unit: cm; and $J_R$ refers to the gamma-ray flux of the formation received by the detector, unit: number of photons $cm^{-2}$.

4. The fast forward method for gamma-ray logging of highly-deviated and horizontal wells according to claim 2, wherein step S12 comprises the following processes:

under the condition of the straight well, in the case that the formation is considered to be in the shape of a parallel slab, a scintillator in the gamma-ray detector is considered to be in the shape of a point and coincides with the center of the detector, and the influence of a wellbore environment and the outer wall of the instrument is ignored, establishing a cylindrical coordinate system with the center of the gamma detector as the origin;

within the effective detection radius $r_0$ of the gamma detector, considering a formation at a vertical distance of z from the center of the gamma detector along the well axis as an infinitely thin slab surface source perpendicular to the well axis;

dividing the surface source into several sector differentials $d_s$ with the well axis as the center, where the contribution of the sector differential $d_s$ to the gamma-ray flux at the center of the gamma detector is as follows:

$$d\phi_{r_0z} = \frac{I_0}{4\pi(r^2+z^2)}e^{-\mu\sqrt{(r^2+z^2)}}ds = \frac{I_0}{4\pi(r^2+z^2)}e^{-\mu\sqrt{(r^2+z^2)}}rdrd\varphi$$

so in the effective detection space $r_0$, the gamma-ray flux of the thin slab surface source of the formation at a distance of z from the center of the detector along the well axis to the detector is expressed as follows:

$$\phi_{r_0z} = \frac{I_0}{2}\int_{\mu z}^{\mu r_0}\frac{e^{-t}}{t}dt$$

replacing a gamma-ray flux $\Phi_z$ of the thin slab surface source of the infinitely large formation (at a distance of z from the center of the gamma detector along the well axis) to the gamma detector in the infinitely large space with the above formula:

$$\phi_z = \frac{I_0}{2}\int_0^{\frac{\pi}{2}}e^{-\mu z \sec\theta}\tan\theta d\theta$$

under the condition of the straight well, enabling the contribution coefficients of the formations at different distances from the detector in the effective detection space to the gamma-ray flux of the detector to be equivalent to the contribution coefficients of the formations at different distances from the detector in an infinitely large integral space to the gamma-ray flux of the detector;

where, $I_0$ refers to the gamma source intensity density of the formation, unit: number of photons·$cm^{-3}$;

$d_s$ refers to the sector differential in the thin slab surface source of the formation at a vertical distance of z from the center of the gamma detector along the well axis;

$\mu$ refers to the average linear attenuation coefficient of gamma-rays passing through the formation, unit: $cm^{-1}$;

r refers to a distance between the sector differential in the formation and the well axis, and a value interval is $$\left[0, \sqrt{r_0^2 - z^2}\right];$$

unit: cm;

$\theta$ is an included angle between a line of connecting a certain point on a circle with the well axis as the center and with a radius of r to the center O of the gamma detector and the well axis from the center of the gamma detector to the surface source of the infinitely thin slab formation at a distance of z from the center of the gamma detector along the well axis;

$\varphi$ refers to an included angle between a certain point with a radius vector of r and an X axis in the cylindrical coordinate system, and $d\varphi$ refer to a differential thereof.

5. The fast forward method for gamma-ray logging of highly-deviated and horizontal wells according to claim 4, wherein step S1 further comprises step S13 implemented by further obtaining a fitting formula of the one-dimensional equivalent longitudinal contribution coefficient.

6. The fast forward method for gamma-ray logging of highly-deviated and horizontal wells according to claim 5, wherein the further obtaining a fitting formula of the one-dimensional equivalent longitudinal contribution coefficient is specifically implemented by:

step S13: performing function fitting on numerical integral calculation results in the effective detection space, and obtaining a bilateral function fitting expression of the one-dimensional equivalent longitudinal contribution coefficient by using a double exponential model.

7. The fast forward method for gamma-ray logging of highly-deviated and horizontal well according to claim 6, wherein in step S13, the obtaining a bilateral function fitting expression of the one-dimensional equivalent longitudinal contribution coefficient by using a double exponential model is specifically implemented by: fitting the one-dimensional equivalent longitudinal contribution coefficient in the following manner:

normalizing the gamma source intensity density of the formation/o, and fitting a gamma-ray flux $\Phi_{r_0 z}$ of the surface source of the formation at a distance of z from the center of the detector in the effective detection space under the condition of the straight well to the detector to obtain a double-exponential function fitting model:

$$g_z = Ae^{bz} + Ce^{dz}$$

where A, C, b and d are fitting coefficients; and calculating a natural gamma flux of the surface source (at a vertical distance of z from the center of the detector along the well axis under the condition of the straight well) at the center of the gamma detector by using the double-exponential function fitting model in the effective detection space, and normalizing the natural gamma flux such that the sum of the natural gamma-ray fluxes $g_z$ of the surface sources (at different distances from the center of the detector along the well axis) at the center of the gamma-ray detector is 1, and then the one-dimensional equivalent longitudinal contribution coefficient is obtained.

8. The fast forward method for gamma-ray logging of highly-deviated and horizontal wells according to claim 7, wherein step S2 comprises the following steps:

step S21: constructing an equivalent detection sphere whose radius is the effective detection radius $r_0$ of the gamma detector by taking a current detection point as the center of the sphere, and determining an effective gamma-ray flux contribution area of the current detection point; and step S22: when the wellbore is perpendicular to the formation, directly adopting an equivalent integral under the condition of the straight well; and when an included angle between the wellbore and the formation is less than 90°, in an effective gamma-ray flux contribution space, converting the integral of the gamma-ray flux received by the detector under the condition of the deviated well into the equivalent integral under the condition of the straight well;

where the equivalent integral under the condition of the straight well is obtained by using the one-dimensional equivalent longitudinal contribution coefficient to perform weighted accumulation on the gamma-ray fluxes of the formations at different distances from the center of the gamma detector within the effective detection range.

9. The fast forward method for gamma-ray logging of highly-deviated and horizontal wells according to claim 8, wherein step S22 comprises the following steps:

calculating a vertical distance between the current detection point and each formation interface, obtaining a contribution coefficient of each part of the formation to an integral of the gamma-ray flux of the current point by using the double-exponential function fitting model in step S13, and performing weighted integration on the gamma-ray flux contribution of each part of the formation along the normal direction of the formation to obtain a gamma-ray flux of the detection point.

10. A fast forward system for gamma-ray logging of highly-deviated and horizontal wells, wherein fast forward for gamma-ray logging of highly-deviated and horizontal wells is performed by using the fast forward method for gamma-ray logging of highly-deviated and horizontal wells according to claim 1, and the system comprises the following modules:

a logging condition determination module, configured to determine intersection situations of a logging record point and a formation boundary, and determine whether a logged well is a straight well or a deviated well;

a gamma-ray equivalent longitudinal coefficient determination module under the condition of the straight well, configured to, based on an effective detection space of a gamma detector, in the effective detection space, obtain one-dimensional longitudinal equivalent contribution coefficients (varying with distances between formations and the detector) of the formations at different distance from the detector to a gamma-ray flux received by detector under the condition of the straight well;

a conversion module for integrals of gamma-ray fluxes, configured to convert an integral of the gamma-ray flux received by the detector under the condition of the deviated well into an equivalent integral of a gamma-ray under the condition of the straight well; and a forward module, configured to calculate a forward value of each measurement point.

\* \* \* \* \*